United States Patent [19]

Chang et al.

[11] Patent Number: 4,732,744

[45] Date of Patent: Mar. 22, 1988

[54] PROCESS FOR THE COMBINED REMOVAL OF $SO_2$ AND $NO_x$ FROM FLUE GAS

[75] Inventors: Shih-Ger Chang, El Cerrito; David K. Liu, Oakland, both of Calif.; Elizabeth A. Griffiths, Neston, England; David Littlejohn, Oakland, Calif.

[73] Assignee: The United States of America as represented by the United States Department of Energy, Washington, D.C.

[21] Appl. No.: 923,541

[22] Filed: Oct. 27, 1986

[51] Int. Cl.[4] ........................ C01B 21/00; C01B 17/00

[52] U.S. Cl. ........................................ 423/235; 423/243

[58] Field of Search .................... 423/235, 235 D, 239, 423/239 A, 244 A, 244 R, 243

[56] References Cited

U.S. PATENT DOCUMENTS

| | | | |
|---|---|---|---|
| 3,932,585 | 1/1976 | Moriguchi et al. | 423/235 |
| 3,984,522 | 10/1976 | Saita et al. | 423/235 |
| 4,044,101 | 8/1977 | Hisamatsu et al. | 423/235 |
| 4,079,118 | 5/1978 | Gorai | 423/235 |
| 4,081,509 | 3/1978 | Hishinuma et al. | 423/235 |
| 4,091,074 | 5/1978 | Gorai et al. | 423/235 |
| 4,126,529 | 11/1978 | DeBerry | 423/242 |
| 4,347,227 | 8/1982 | Hass et al. | 423/235 |
| 4,423,158 | 12/1983 | Porath | 521/32 |

OTHER PUBLICATIONS

Tu et al. "Chemistry of a Flue Gas Combined $NO_x$ and $SO_2$ Scrubber Employing Ferrous Cysteine Additives", Apr. 1986.

*Textbook of Biochemistry,* 4th ed. West et al., MacMillan Company, 1966, p. 1248.

*Primary Examiner*—Gregory A. Heller
*Attorney, Agent, or Firm*—Harold M. Dixon; L. E. Carnahan; Judson R. Hightower

[57] ABSTRACT

The present invention in one aspect relates to a process for the simultaneous removal of $NO_x$ and $SO_2$ from a fluid stream comprising mixtures thereof and in another aspect relates to the separation, use and/or regeneration of various chemicals contaminated or spent in the process and which includes the steps of:

(A) contacting the fluid stream at a temperature of between about 105° and 180° C. with a liquid aqueous slurry or solution comprising an effective amount of an iron chelate of an amino acid moiety having at least one —SH group;

(B) separating the fluid stream from the particulates formed in step (A) comprising the chelate of the amino acid moiety and fly ash;

(C) washing and separating the particulates of step (B) with an aqueous solution having a pH value of between about 5 to 8;

(D) subsequently washing and separating the particulates of step (C) with a strongly acidic aqueous solution having a pH value of between about 1 to 3;

(E) washing and separating the particulates of step (D) with an basic aqueous solution having a pH value of between about 9 to 12;

(F) optionally adding additional amino acid moiety, iron (II) and alkali to the aqueous liquid from step (D) to produce an aqueous solution or slurry similar to that in step (A) having a pH value of between about 4 to 12; and (G) recycling the aqueous slurry of step (F) to the contacting zone of step (A).

Steps (D) and (E) can be carried out in the reverse sequence, however the preferred order is (D) and then (E).

In another preferred embodiment the present invention provides a process for the removal of $NO_x$, $SO_2$ and particulates from a fluid stream which includes the steps of (A) injecting into a reaction zone an aqueous solution itself comprising (i) an amino acid moiety selected from those described above; (ii) iron (II) ion; and (iii) an alkali, wherein the aqueous solution has a pH of between about 4 and 11; followed by solids separation and washing as is described in steps (B), (C), (D) and (E) above. The overall process is useful to reduce acid rain components from combustion gas sources.

48 Claims, 13 Drawing Figures

TABLE 1

THE CHEMICAL COMPOSITION OF PRECIPITATES FROM AQUEOUS REACTIONS OF FERROUS CYSTEINE, AT SEVERAL MOLAR RATIOS OF CYSTEINE TO FERROUS ION, WITH NO AT pH 7 AND 8, AND 55° C

| | $(n_{CYSTEINE}/n_{Fe^{2+}})_{SOLUTION}$ | 2 | 3 | 4 | 5 | 6 |
|---|---|---|---|---|---|---|
| pH7 | $\left(\frac{n_{NO}}{n_{Fe^{2+}}}\right)_{ppt}$ | 1.95 | 1.9 | 2.2 | 2.1 | 1.92 |
| | $\left(\frac{n_{CYSTEINE}}{n_{Fe^{2+}}}\right)_{ppt}$ | 3.0 | 2.0 | 2.0 | 4.3 | 2.0 |
| pH8 | $\left(\frac{n_{NO}}{n_{Fe^{2+}}}\right)_{ppt}$ | 0 | 0 | 0 | 0 | 0 |
| | $\left(\frac{n_{CYSTEINE}}{n_{Fe^{2+}}}\right)_{ppt}$ | 1.73 | 2.07 | 2.14 | 2.83 | 3.42 |

FIG. 10

TABLE 2

THE ELEMENTAL ANALYSES OF PRECPITATES FROM REACTIONS OF FERROUS CYSTEINE WITH NO AT pH7 AND 55° C

| $n_{CYSTEINE}/n_{Fe^{2+}}$ | C (%) | H (%) | N (%) | S (%) | Fe (%) | EMPIRICAL FORMULA |
|---|---|---|---|---|---|---|
| 2 | 20.27 | 3.80 | 11.90 | 16.69 | 9.59 | $Fe(C_3H_7NS)_3(NO)_2$ |
| 3 | 19.66 | 3.40 | 14.85 | 17.73 | 14.70 | $Fe(C_3H_6NS)_2(NO)_2$ |
| 4 | 20.88 | 3.60 | 14.83 | 17.82 | 13.10 | $Fe(C_3H_6NS)_2(NO)_2$ |
| 5 | 24.26 | 4.18 | 13.48 | 20.56 | 8.65 | $Fe(C_3H_7NS)_4(NO)_2$ |
| 6 | 19.67 | 3.58 | 14.15 | 17.10 | 14.12 | $Fe(C_3H_7NS)_2(NO)_2$ |

FIG. 11

TABLE 3

COMPARISON OF NO ABSORPTION CAPACITY IN AQUEOUS SOLUTIONS CONTAINING $Fe^{2+}$(CYSTEINE) AND $Fe^{2+}$(EDTA) ($Fe^{2+}$=CYSTEINE=EDTA=$10^{-2}$ M, $P_{NO}$=800 ppm, pH=7 AND AT 55° C)

| METAL COMPLEXES | $O_2$ | NO ABSORBED(M) |
|---|---|---|
| $Fe^{2+}$ (CYSTEINE) | 0 | $9.0 \times 10^{-3}$ |
| | 5% | $6.5 \times 10^{-4}$ |
| $Fe^{2+}$ (EDTA) | 0 | $5.0 \times 10^{-3}$ |
| | 5% | $5.1 \times 10^{-4}$ |

FIG. 12

PROCESS FOR THE COMBINED REMOVAL OF $SO_2$ AND $NO_x$ FROM FLUE GAS

BACKGROUND OF THE INVENTION

The U.S. Government has rights in this invention pursuant to Contract No. DE-AC03-76SF00098 awarded by the U.S. Department of Energy to the University of California.

The present invention relates to an improved process for the combined removal of $NO_x$ and $SO_2$ from a fluid stream using a chelate of an amino acid moiety, iron (II) ion, and alkali using a spray-drying process to contact the $NO_x$ and $SO_2$ with the iron chelate, and also in one aspect provides a process for the production of cysteine (which is one monomeric amino acid that can be used in the process) from cystine.

The concern about acid rain has attracted considerable attention in the United States and Europe. The signs of acidification of the environment due to acid rain has become obvious in areas downwind from major sources of combustion gases, e.g., smokestacks, power plants, smelting, producing $NO_x$ and $SO_2$. Major affected areas include Northeastern United States, Southeastern Canada and in the Scandinavian countries in Europe. A major research effort is underway to reduce $NO_x$ and $SO_2$ levels from gases from combustion sources in an overall cost effective manner.

A number of presently used techniques include lime/limestone wet flue gas desulfurization scrubbing, which is the most widely-used process in the utility industry. This and related processes require disposal of a large amount of solid waste, e.g., calcium sulfate and calcium sulfite. Some patents of interest include, for example, U.S. Pat. Nos. 3,984,522 and 4,044,101 assigned to Asahi which disclose a process for removing NO from a gas stream using a solution containing an iron chelate and sulfur moieties. Although cysteine is taught in Asahi U.S. Pat. No. 3,984,522, ethylenediaminetetracetic acid (EDTA), which is disclosed among the many chelates is actually used (i.e., EDTA is the choice chelate) in the commercial Asahi processes.

The problems associated with the regeneration of scrubbing liquors and ferrous chelates associated with present technology, e.g., the Asahi process, are considerable. Scrubbing liquors are pumped to evaporators in the regeneration system, concentrated, then pumped to a cooling crystallizer where hydrated sodium dithionate and sulfate crystals are produced under vacuum. The crystals are next separated from the mother liquor and dried at 250°-300° F. in which the hydrated crystals are converted to anhydrous sodium salts. Most of the mother liquor is recycled to the reducing tank and a smaller stream is passed through a N-S compound treatment step. The N-S compounds are converted to relatively insoluble potassium salts by reaction with potassium sulfate. The potassium salts are separated and sent to a thermal cracker for decomposition at about 930° F.

A very high capital investment is associated with the Asahi process because of the necessity of large absorbers, evaporators, crystallizers, dryers, rotary kiln crackers and screw decantor separators. The major operating and maintenance costs are high and include electricity, fuel oil, steam and chemicals, such as soda ash, and limestone.

Additional U.S. patents of interest include U.S. Pat. Nos. 4,347,227, 4,423,158, 4,079,118, 4,091,074, 3,932,585, 4,081,509, and 4,126,529.

None of these patents disclose the use of an amino acid moiety as a chelating agent in the removal of $NO_x$ and $SO_2$ from combustion gases as is described in the present invention. It would also be extremely valuable to have an iron chelating system in which the production of dithionate and nitrogen-sulfur compounds can be suppressed or avoided.

SUMMARY OF THE INVENTION

The present invention in one aspect relates to an improved process for the simultaneous removal of $NO_x$ and $SO_2$ from a fluid stream comprising mixtures of $NO_x$ and $SO_2$, which process includes the steps of:

(A) contacting the fluid stream with a liquid aqueous slurry or solution, the slurry or solution itself comprising an effective amount of an iron chelate of an amino acid moiety having at least one —SH group and an alkali;

(B) separating the fluid stream from the particulates formed in step (A) said particulates comprising the iron (II) chelate of the amino acid moiety and fly ash, and separating any liquid phase from the gas phase in said separated fluid stream;

(B-1) optionally the separated particulates from step (B) are heated to a temperature sufficient to desorb NO (i.e., a temperature in the range of between about 75 and 200° C.);

(C) washing the particulates of step (B) with a relatively neutral aqueous solution, i.e., having a pH value of between about 5 to 8 with subsequent separation of the aqueous wash and particulates; following said neutral wash, the particulates of the neutral wash are subjected to at least two additional sequential treatments or washes, first with an acidic aqueous solution or an alkaline aqueous solution; and, subsequently the separated solids are washed with the other of said acidic or alkaline solutions.

Preferably, the steps following said neutral wash are as follows:

(D) subsequently washing the separated particulates of step (C) with a strongly acidic aqueous solution having a pH value of between about 1 to 3 with subsequent separation of the aqueous wash and particulates;

(E) washing the separated particulates of step (D) with an aqueous alkaline solution having a pH value of between about 9 to 12 with subsequent separation of the aqueous wash and particulates;

(F) optionally adding additional amino acid moiety, iron (II) and alkali to the aqueous wash of step (D) to produce an aqueous slurry; and (G) recycling the aqueous slurry of step (F) to the contacting zone of step (A).

It is to be noted that the sequence of steps (D) and (E) can be reversed; however, the above sequence is generally preferred to increase the recovery of the amino acid moiety component.

It is an object of the present invention to provide economy by recycling many of the chemical components of the process including, for instance;

step (C-1), after step (C) and before step (D), the aqueous liquid wash contains sodium borate, sodium sulfite, sodium sulfate and sodium nitrate, the sodium borate is separated from the sodium sulfite, sodium sulfate and sodium nitrate by conventional means and is combined in another vessel with additional amino acid moiety and iron (II) ion for recycle to the contact zone of step (A); and if desired, the sodium sulfite can be separated from the sodium sulfate and sodium nitrate by conventional means for reuse in the process; and step (E-1), after step (E) and before step (F), the aqueous wash includes dimeric amino acid which is treated with sulfite and sulfide ion to produce the monomeric amino acid which can be combined with the iron (II) ion and the sodium borate from the above and the treating mixture recycled to the contacting zone of step (A).

In another aspect, the invention relates to the separation, use and/or regeneration of various chemicals spent or otherwise contaminated in a process for removing $NO_x$ and $SO_2$ from a gas stream containing same by contacting said stream with a mixture of an iron (II) chelate of an amino acid moiety having at least one-SH group and an alkali to form $NO_x$ and $SO_2$ contaminated iron (II) amino acid chelate and alkali, the improvement consisting of:

(1) recovering a mixture of solids of the $NO_x$ and $SO_2$ contaminated mixture of said iron (II) amino acid chelate and alkali;

(1—1) optionally heating said solids to a temperature in the range of about 75° to 200° C. to desorb NO;

(2) washing said solids with a relatively neutral aqueous solution and separating said solids from the aqueous liquid;

(3) subjecting the solids from step (2) to at least two additional sequential treatments comprising washing with one of an acidic aqueous solution or an alkaline aqueous solution followed by washing the separated solids with the other of said acid or alkaline aqueous solutions;

(4) optionally adding additional amino acid moiety, iron (II) and alkali to the separated acid wash which aqueous mixture can be used to treat a gas stream for removal of $NO_x$ and $SO_2$;

(5) optionally alkali metal sulfite may be recovered from the separated aqueous neutral wash from step (2);

(6) optionally adding the separated aqueous wash from the acidic washing from step (3) to the mixture of step (4);

(7) optionally the separated aqueous wash from the alkaline wash which contains dimeric amino acid is treated with recovered alkali sulfite, sulfate and sulfides to produce the monomeric amino acid which is suitable for use in forming iron (II) amino acid chelate for use in removing $NO_x$ and $SO_2$ from gas streams.

It is a further object of the present invention to provide an improved process for the preparation of cysteine from cystine, wherein the process includes reacting an aqueous alkaline solution of cystine at a pH between about 9 to 13 with a reducing agent selected from hydrogen sulfide, alkali metal sulfides, sulfur dioxide, alkali metal sulfites or mixtures thereof, for a time and a temperature effective to cleave and reduce the cystine to cysteine and recovering the formed cysteine.

It is an additional object of the present invention to provide a process for the removal of $NO_x$, $SO_2$ and particulates from a fluid stream, which includes the steps of:

(a) spray injecting into the fluid stream in a contact zone an aqueous slurry or solution, itself comprising (i) an amino acid moiety selected from cysteine, glutathione, penicillamine, or N-acylcysteine, wherein the N-acyl group contains from 2 to 10 carbon atoms; (ii) iron (II) ion which forms an amino acid iron chelate; and (iii) an alkali wherein said aqueous solution has a pH of between about 4–12;

(b) collecting and optionally heating the particulates obtained in step (a) to desorb NO and whether first heated or not, then washing said particulates with an aqueous solution having a pH of between about 5 and 8 followed by separation of the aqueous wash and the particulates;

(c) subsequently washing of the particulates of step (b) with a strongly acidic aqueous solution having a pH between about 1 to 3 followed by separation of the aqueous wash and the particulates;

(d) washing the particulates from step (c) with an aqueous alkaline solution having a pH between about 9 to 12 followed by separation of the aqueous wash and the particulates; and (e) recycling the aqueous slurry from step (c) to the vessel for preparing the amino acid iron (II) chelate and alkali metal compound, (e.g., sodium borate) treating mixture for recycle to the contact zone of step (a).

It is yet another object to provide a process for the simultaneous removal of $NO_x$ and $SO_2$ from a fluid stream comprised of $NO_x$ and $SO_2$, which process comprises:

(AA) contacting the fluid stream in a contacting zone with an aqueous reaction mixture, said mixture comprising an effective amount of an iron (II) chelate of an amino acid moiety having at least one —SH group and preferably also containing an alkali;

(BB) separating the fluid stream from the particulates formed in step (AA) which particulates comprise the iron chelate of the amino acid moiety, alkali and fly ash;

(BB-1) optionally heating the separated solids from step (BB) to desorb NO (i.e., to a temperature in the range of between about 75° and 200° C.

(CC) washing the particulates of step (BB or BB-1) with a relatively neutral aqueous solution having a pH of between about 5 and 8 with subsequent separation of the aqueous wash and the particulates;

(DD) treating the aqueous wash of step (CC) with calcium carbonate to form calcium salts including calcium sulfite and calcium sulfate;

(EE) separating the solid calcium sulfite and calcium sulfate particulates formed in step (DD) from the aqueous solution containing sodium borate; and (FF) optionally recycling the aqueous solution of step (EE) to (HH);

(GG) washing the particulates of step (CC) with a strongly acidic aqueous solution having a pH of between about 1 and 3 with subsequent separation of the aqueous wash and the particulates; and (HH) to the separated liquid wash from step (GG), optionally adding additional amino acid moiety iron (II) ion, and alkali to produce an effective chelating aqueous solution or slurry having a pH of between about 5 and 11; and (JJ) recycling the aqueous solution of step (HH) to the contacting zone of step (AA);

(KK) optionally washing the particulates from step (GG) with an alkaline aqueous solution having a pH of between about 9 and 12 and then separating the aqueous wash containing dimeric amino acid from the particulates containing fly ash; and (LL) recycling the wash containing dimeric amino acids to a vessel for cleaving and reducing the dimeric acid to the monomeric form (e.g., a vessel (1) containing $H_2S$ and/or $SO_2$ and/or the corresponding alkali metal sulfides, sulfites/bisulfites; (2) by known electrochemical treatment; or (3) by the known reduction using zinc and HCl, etc.).

It is also an object of the present invention to provide a process which further includes step (EE-1) after (EE) and before step (FF) wherein the aqueous solution of step (EE) typically includes alkali metal (e.g., sodium) salts; to wit the borate, sulfite, sulfate and nitrate salts, and the borate is separated by conventional means and then is combined with additional amino acid moiety and iron (II) ion for recycle to the contact zone of step (AA); and step (HH) is performed.

It is yet another object to provide an economical method of removal of $NO_x$ and $SO_2$ by recycling the aqueous wash solutions as is also described hereinabove.

Other objects of the present invention will become readily apparent to those skilled in this art from the following description and the accompanying drawings.

BRIEF DESCRIPTION OF THE DRAWINGS

FIG. 1 shows the structures of cysteine (CySH), cysteinatotriaquoiron (II) [$Fe(CyS)(H_2O)_3$], Compound AA; $Fe(AcCyS)(H_2O)_3$, Compound AB, N-acetyl cysteine, where $R^1$ is —(C=O)$CH_3$ and $R^2=R^3=H$; $Fe[(CH_3)_2CyS](H_2O)_3$, Compound AC, penicillamine, where $R^1=H$, $R^2=R^3=CH_3$; and the corresponding 1:2 adduct, trans-biscysteinatodiaquoiron (II) [$Fe(CyS)_2(H_2O)_2]^{-2}$, and the like.

FIG. 10 shows Table 1 of the chemical composition of precipitates.

FIG. 11 shows Table 2 of the elemental analyses of precipitates.

FIG. 12 shows Table 3 comparing NO absorption in aqueous solutions of $Fe^{2+}$ (cysteine)$_2$ and $Fe^{2+}$ (EDTA).

DETAILED DESCRIPTION OF THE INVENTION AND PREFERRED EMBODIMENTS

Figure 1:
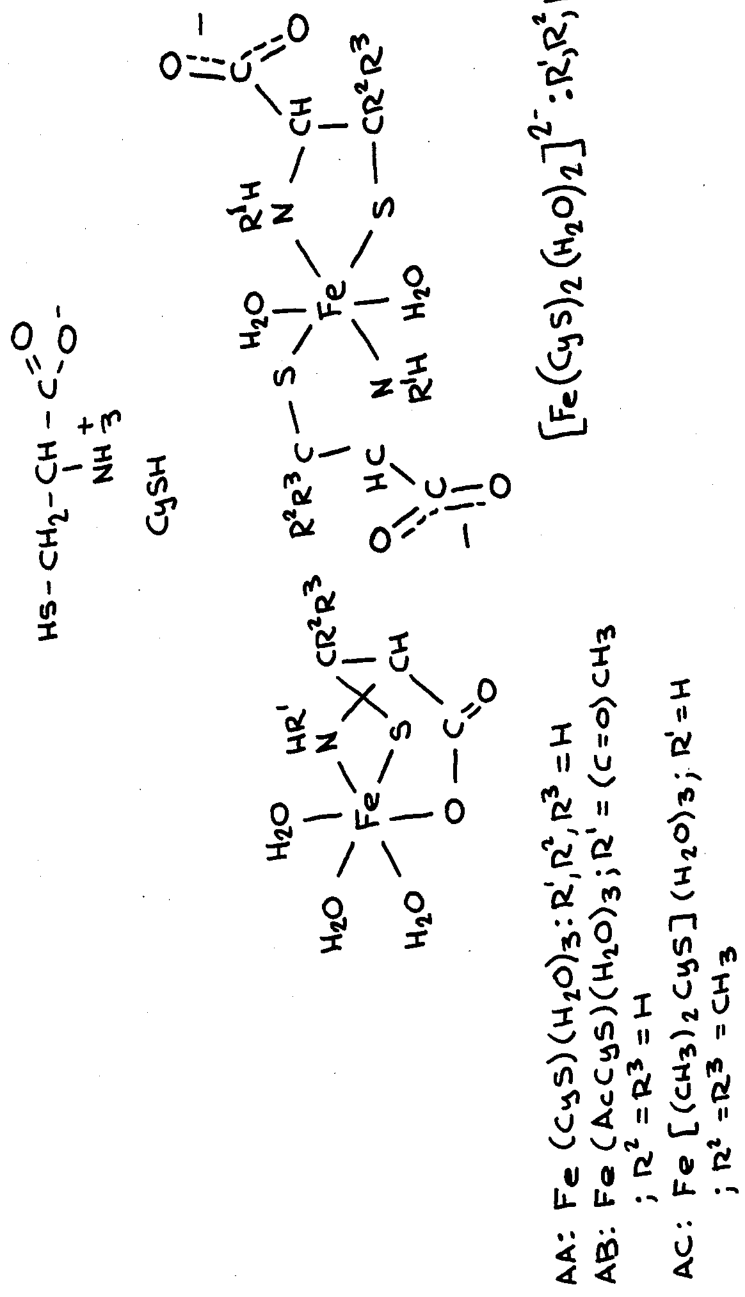

As used herein: "Alkali" means a basic salt and includes the metals sodium, potassium, lithium calcium and magnesium; but preferably is sodium or potassium in that order.

"Amino acid moiety" refers to an amino acid, an N-substituted amino acid, a sidechain substituted amino acid, a peptide comprising amino acids, substituted amino acids or mixtures thereof.

"Amino acid" refers primarily to cysteine and cystine, i.e., those amino acids which contain a sulfur atom as a thiol, —SH. Although a D-configuration, an L-configuration or a mixture of the amino acids are used for specific experiments described herein, it is to be understood that the D-, L-, or mixtures of amino acids thereof may be used in the present invention.

"Contact zone" refers to the contacting area, of the fluid, e.g., the flue gas, with the aqueous solution or slurry comprising the amino acid chelate, iron (II) ion [iron$^{2+}$] ion, alkali and the like. The contacting zone may include, for example, a spray-drying process, direct duct injection into the flue gas or the conventional bubbling of the flue gas through an aqueous solution of the chelate and iron (II) ion.

"Fluid stream" refers to a liquid stream, gaseous stream or mixture thereof. In the present invention, preferred fluid streams include combustion flue gases particularly from the burning of sulfur and nitrogen containing materials, such as, petroleum, natural gas, coal, coal derived fuels, shale oil retorts, tar sands and the like. However, suitable streams can be obtained from chemical processing and are included within the scope of this invention.

"Peptide" refers to those natural or synthetic amino acids having multiple $$\begin{array}{cc} H & O \\ | & \| \\ -N- & C- \end{array}$$

linkages. Amino acids and/or peptides having up to about 100 amino acid units are preferred. More preferred ones have less than about 10 amino acids, and particularly preferred are ones having about 1-3 amino acid groups inclusively. The amino acids may be both unsubstituted and substituted. The peptide will have at least one —SH group, usually as a cysteine, N-acylcysteine, penicillamine or glutathione.

"Slurry" or "solution" refer to aqueous mixtures of materials such as amino acid moiety, buffer iron (II) ion and the like. Slurry and solution as a state of the composition depend upon concentrations of the materials. In some uses the concentrations of the materials will be high enough that not all of the materials will dissolve to become a solution.

"Spray drying" herein includes not only spraying (atomizing) a liquid into a gas, but "direct duct injection" of the spray into a gaseous stream followed by immediate vaporization unless expressly indicated otherwise or is apparent from context. Direct duct injection requires adjustment of the liquid injection so as to achieve vaporization without liquid deposition on the duct walls.

"Substituted amino acid" generally refers to those amino acids wherein the hydrogen in the amino group is substituted by an alkyl or an acyl group. The N-alkyl groups have from 1 to 10 carbon atoms. Methyl and ethyl groups are preferred. The N-acyl groups have from 2 to 10 carbon atoms (both aliphatic and aromatic). N-acylcysteine is a preferred grouping. Acetyl and propionyl groups are more preferred. Acetyl is particularly preferred. Sidechain substituted amino acids are those where one or more hydrogens on the sidechain is further substituted by one or more lower alkyl groups (1-4 carbon atoms). Methyl groups are preferred. Penicillamine, [$\beta$, $\beta$-dimethylcysteine], $HO_2C$-CH—$(NH_2)C(CH_3)_2SH$, is an especially preferred sidechain substituted amino acid.

In the present invention, cysteine or derivatives of cysteine are described in three types of abbreviations, e.g., cysteine=CY or CySH or CYSH and cystine=-$CY_2$ or CySSCy or CYSSCY.

The terms "cysteine" and "cystine" and used herein to describe interconvertible monomeric, i.e., containing —SH and "dimeric" amino acid groups, i.e., containing —S—S—, respectively. It is to be understood that any amino acid or peptide having a reducing thiol group as described herein will undergo the same general oxidation and reduction reactions in the present invention.

Preparation of Amino Acid Iron Chelate

The preparation of the chelate is readily achieved as the conditions are generally mild and not critical. The temperature and pressure can be ambient providing, of course, the temperature is above freezing for the aqueous solutions. Preferred ambient temperature is the more usual 18°-25° C., or typical room temperature. The amino acid compounds are described adequately herein elsewhere in terms of carbon content, the number of $$-\overset{H}{\underset{|}{N}}-\overset{O}{\underset{\|}{C}}-$$

linkages, D and L isomers; or more precisely, tautomers, and the nitrogen or hydrocarbon chain (i.e., branched) substitutions. It suffices here to say that the monomeric amino acid is dissolved in water and mixed with a water soluble ferrous or ferric salt such as ferrous or ferric sulfate. (The ferric ion is reduced in situ to the ferrous ion by the amino acid moiety.) The relative amounts of amino acid to iron can be about 1 to 1 or "stoichiometric" amounts based on the chelation capacity of the amino acid to ferrous ion; however, to provide resistance to oxidation an excess of amino acid is advantageous, and a ratio of between about 10/1 to 25/1 is preferred. The pH of the chelate formation is not critical and can be carried out over a relatively wide range of about 4 to 12. While the pH is not critical, it is important for this preparation. Preferably the pH of the preparation of this chelate is in the range of about 6 to 10.

In actual use the pH of the chelate containing fluid is generally in the range of about 4 to 12. However, there are differences in preferred pH in some cases depending on the particular amino acid used and other factors. A pH of 8-12 is preferred for the $SO_2$ removal and for $NO_x$ removal the broader pH range is about 6-12. Preferred pH for glutathione is about 5-10 and for the other three amino acids is about 7-10.

Figure 2:
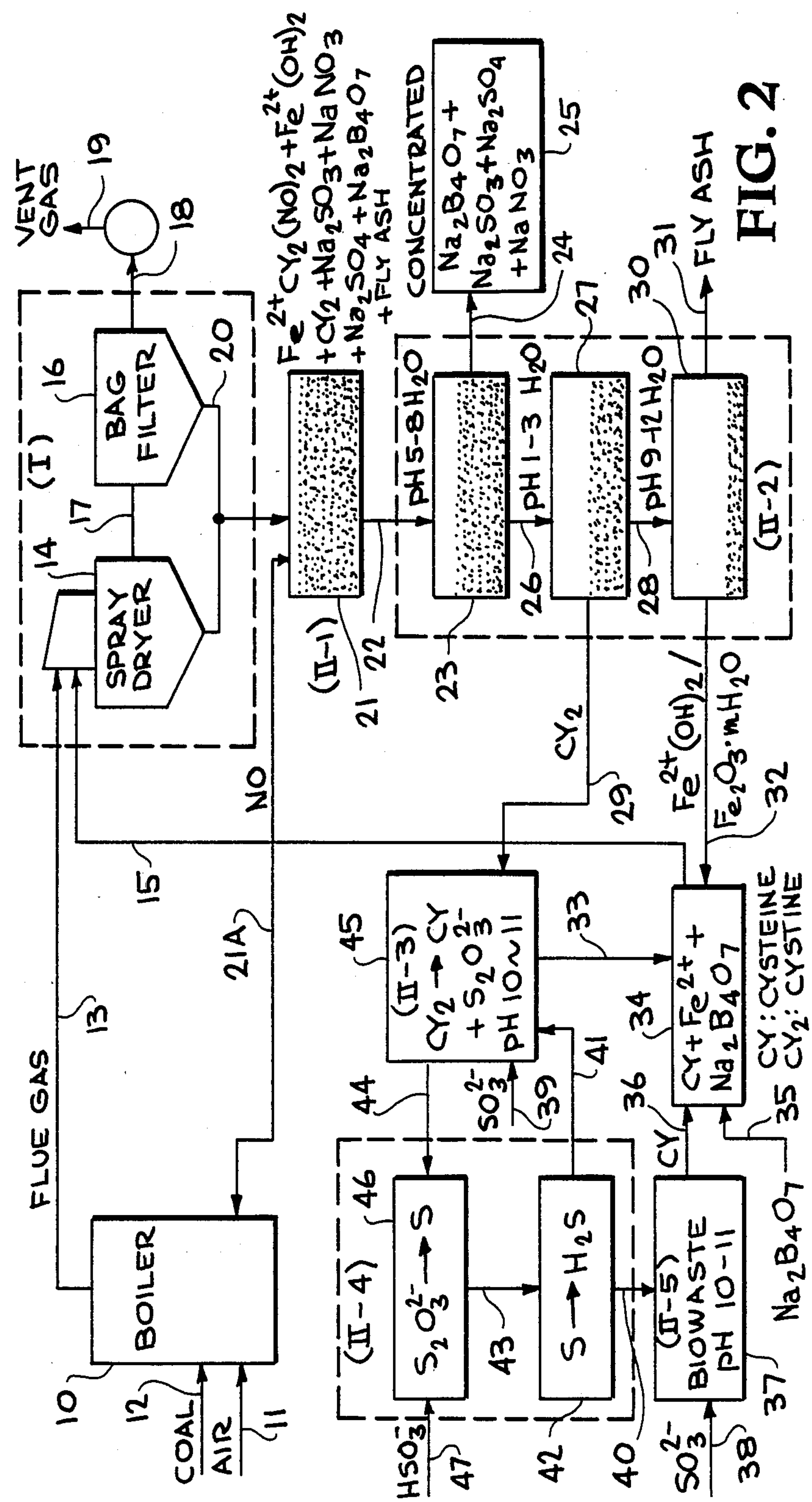
FIG. 2 is a detailed schematic for a regnerable spray drying process for the combined removal of $SO_2$, $NO_x$ and particulate (fly ash) from flue gas.

Now in describing the general reaction of the present invention, FIG. 2 is a schematic diagram of a spray drying process employing ferrous cysteine complexes and sodium borate for the simultaneous removal of $NO_x$, $SO_2$ and particulates (primarily flyash) from flue gas. The process is generally divided into a removal step I and a regeneration step II-1 to II-5 (each shown within a dotted outline).

The generation of the combustion gases is shown at boiler 10 with air entering at line 11 and a fuel at line 12. The fuel contains nitrogen and sulfur which on burning produce $NO_x$ and $SO_2$. Typical flue gas streams are obtained from combustion of fuels which include, for example, petroleum, natural gas, coal, coal derived fuels, oil shale retorts, tar sands recovery units and the like; however, suitable streams for use alone or blending may be obtained from chemical processing. The flue gas exits the boiler through line 13 to spray dryer 14. At this point an aqueous solution or slurry of an amino acid moiety capable of forming a chelate with iron (II) salt and an alkali, such as sodium borate ($Na_2B_4O_7$), NaOH or soda ash is sprayed (atomized) into the hot flue gas via line 15. The term "spray drying" herein also includes direct duct injection of the aqueous chelate solution or slurry with immediate vaporization of the liquid as explained above.

Spray Drying

The spray drying functions to produce fine aqueous treating fluid droplets for interaction with $SO_2$ and $NO_x$ in flue gas. The fine droplets have a large surface area per unit mass of aqueous slurry or solution employed. Thus, the mass transfer of flue gas into aqueous slurries or solution increases. As the droplets encounter the hot flue gas, they will heat up, evaporate and become solid particles as residue. For this reason, the initial temperature of the flue gas, while not critical, should be sufficiently high to provide rapid evaporation of the water in the droplets but not evaporate instantly. Typically temperatures in the range of between about 105° to 180° C. will be suitable and preferable; however, more preferably the initial temperature is in the range of about 120° to 150° C. Equipment for spray drying (or atomization) includes, for example, atomizers available from Niro Atomizer, Inc., Columbia, Md. 21045. The droplets injected should have a general diameter of between about 10 and 500 microns, where between about 20 and 200 microns are preferred and between about 50 to 100 microns are more preferred.

Ferrous-cysteine reacts with NO present to form $N_2$ and cystinatodinitrosyliron (II) solid particulates. $SO_2$ and $NO_2$ dissolve in aqueous droplets and are neutralized by the sodium borate to form sodium sulfite and nitrate particulates after the evaporation of liquid and water. Some of the sulfite can be oxidized to the sulfate by residual oxygen in the flue gas. A mixture of particulates containing cystinatodinitrosyliron (II), sodium sulfite, sulfate, nitrate, borate and fly ash with the so conditioned flue gas then enters bag filter 16 via line 17 where the particulates are collected. Residual gases vent through lines 18 and 19.

Regeneration

The regeneration section consists of five parts: (1) Desorption of NO, (2) Separation of sodium sulfite, sulfate, nitrate, and borate, cystine, and iron (II) and (III) from fly ash, (3) Conversion of cystine to cysteine, (4) Production of elemental sulfur and $H_2S$, and (5) Production of cysteine from biowaste. Optional NO Desorption: The particulates are transferred via line 20 to heater 21. An optional step shown in FIG. 2 as II-1 is the heating of particulates collected from the bottom of spray dryer 14 and bag filter 16 to at least about 75° C. and up to about 200° C., to obtain concentrated NO gas, either for recycle back into the boiler via line 21A or for manufacture of commercial products, such as nitric acid. Lower temperatures than that specified above can be used when a vacuum is pulled on this heating for NO desorption, but economics will determine the suitability of such a condition.

In heater 21, the solid product may or may not contain the cystinatodinitrosyliron (II) compound. If the spray drying upstream is performed at a lower pH, e.g., about 6.5 to 7.5 in the absence of oxygen, the cystinatodinitrosyliron (II) compound is observed and detected by infrared spectral analysis. If oxygen is present, essentially no cystinatodinitrosyliron (II) compound is observed. If the spray drying is performed at a pH of about 10 or higher, essentially no cystinatodinitrosyliron (II) compound is observed in the absence of oxygen. Therefore, under normal scrubbing conditions for power plant flue gas, where there is 3-5% oxygen present, heating of particulates may not be necessary.

The amino acid moiety having an —SH group binds to ferrous ion to form the corresponding ferrous chelate, which efficiently binds and reacts with NO to form the chelate dinitrosyl iron (II) dihydrate at pH about 7.5 when ferrous ion is oxidized to ferric ion by residual oxygen in the flue gas, the amino acid moiety having the —SH group can reduce the ferric ion back to useful ferrous ion quickly. At the same time the amino acid —SH group is oxidized to the dimeric —S—S— compound.

Neutral Wash:

The second part (II-2) involves the transfer via line 22 and the washing of a mixture of solid particulates containing cystinatoiron (II), cystine, sodium sulfite, sulfate, nitrate, and borate and fly ash in vessel 23 first with a relatively "neutral" liquid water solution of about pH 5-8 to dissolve sodium sulfite, sulfate, nitrate, and borate and obtain concentrated solutions of these salts for further purification via line 24 to receiver 25. The temperature of this operation or step is not critical, therefore ambient or the normal residual temperature after carrying out the amino acid iron chelate treatment (whether heated for desorption of NO is carried out or not) is suitable for this neutral and subsequent acid and alkaline wash treatments unless otherwise indicated for a particular step. Typical temperatures usually will be in the range of about 5° C. to 60° C. although 10° to 30° C. is usually to be preferred. The $Na_2B_4O_7$, $Na_2SO_3$, $Na_2SO_4$ and $NaNO_3$ in receiver 25 may be separated and/or concentrated by conventional means. The $Na_2B_4O_7$ can be used as the borate stream at line 35. The $Na_2SO_3$ portion when treated with acid to obtain a lower pH value (i.e., less than 7) produces $HSO_3^-$ which is recycled in the process at line 47.

Acid Wash:

The remaining solid particulate mixtures in vessel 23 were then transferred via line 26 and washed with acidic aqueous solutions (pH 1-3) in vessel 27 to dissolve the iron compounds [$Fe^{2+}(OH)_2/Fe_2O_3.nH_2O$] and followed with transfer of the particulate via line 28 to vessel 30.

Alkaline Wash:

The particulates in 30 are then subjected to washing with basic aqueous solutions (pH 9-12), to dissolve cystine ($CY_2$) and to separate them from fly ash 31 which is removed and can be hauled away for disposal. Although the preceding washing steps are described as involving separate lines and separate vessels, it is contemplated that the particulates may remain in the same vessel and be washed with and separated from liquids having different pH values.

The third part (II-3) involves the transfer via line 29 of the remaining solutions (pH 9-12) containing cystine for conversion to cysteine in regeneration tank 45 where $SO_2[SO_3^{-2}]$(line 39) and $H_2S$ [$HS^-$ and/or $S^{-2}$](line 41) are introduced as described below.

The fourth part (II-4) (in dotted outline) involves the acidification (via line 47) of thiosulfate solutions 46 to produce elemental sulfur and bisulfite (43 and 42), and the conversion of elemental sulfur (in 42) to $H_2S$ which can be by a commercially available process and can be used in tank (45) as shown at (41).

The fifth part (II-5) involves the treatment of biowaste materials 37 containing amino acid, e.g., cystine, with $H_2S$ and $SO_2$ (line 38) to produce cysteine (transferred via line 36) to receiver 34 as described below alkali metal compounds, such as $Na_2B_4O_7$, NaOH, KOH, or soda ash, are added to receiver 34 via line 35. This latter mixture is suitable for use in the spray treatment as the amino acid iron (II) chelate and alkali metal compound treating mixture.

Figure 13:
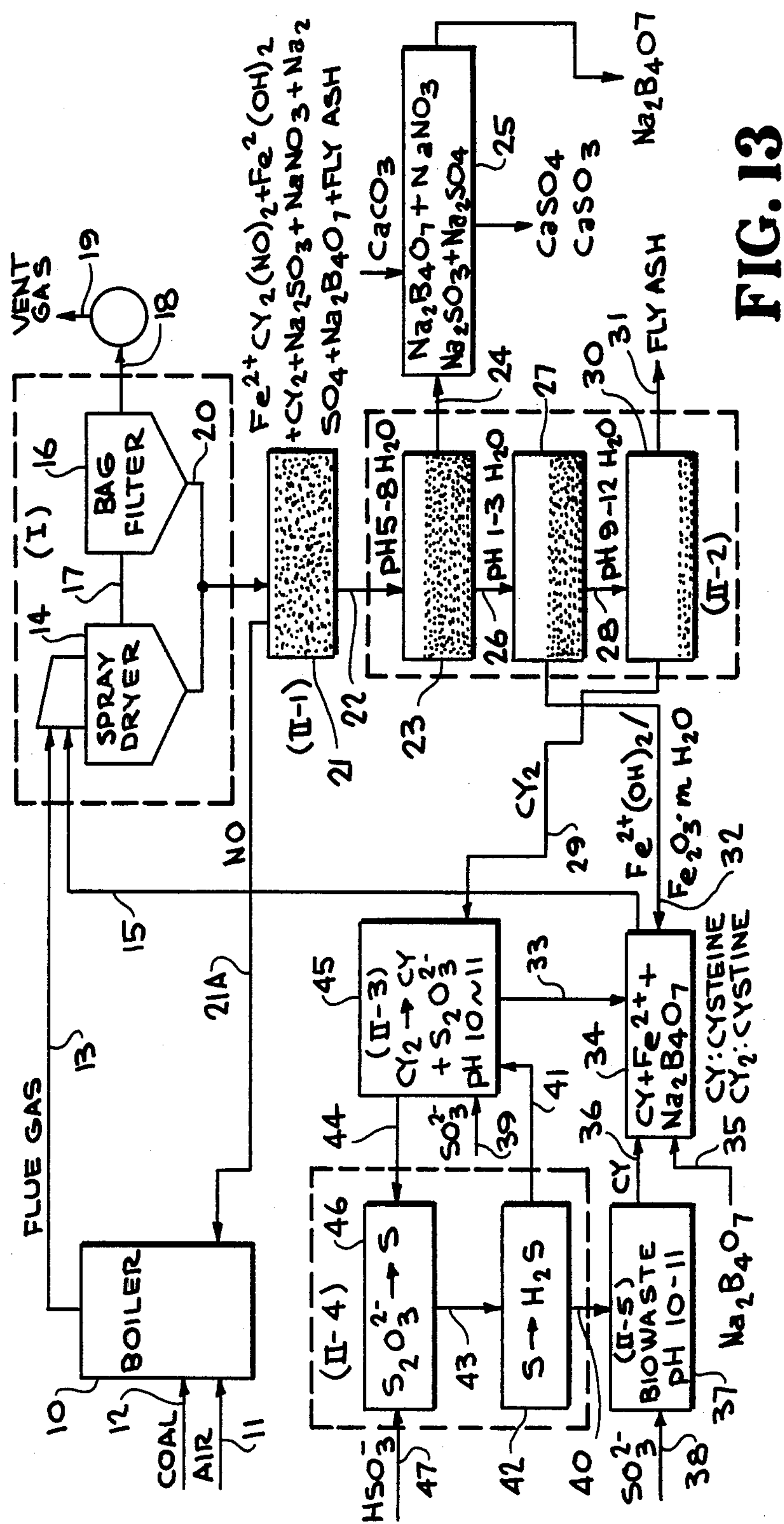
FIG. 13 is a detailed schematic for a spray drying process for the removal of $SO_2$, $NO_x$ and particulates from flue gas using various recycle streams and double alkalis, particularly calcium carbonate.

Double Alkali:

In FIG. 13, a simpler process is disclosed. The process is essentially the same for the process described above in conjunction with FIG. 2, particularly where the figure designation numbers are identical. The process changes occur after the steps involving heater 21 and before the regeneration steps in vessel 34 and vessel 45.

As the slurry or solution leaves heater 21 via line 22 it is treated in vessel 23 with an aqueous solution having a pH of between about 5-8. Usually water alone will be used, but in some cases a base may also be desired to maintain the specified pH. For example, a borate buffer or soda ash is used (the alkali metal salts of Na, K, and Li or alkaline earth metal salts Ca, Mg, etc. can be used and the aqueous phase and the particulates are separated as discussed hereinabove.

The aqueous phase is conveyed via line 24 to a second vessel 25 and further treated with calcium carbonate either in solution or solid form. The solid calcium sulfate and calcium sulfite produced precipitate out and are separated for proper disposal or further processing as desired. The amount of $CaCO_3$ used is stoichiometric amounts, effective to remove the sulfate and sulfite present. The temperatures of the aqueous phase in vessel 23 are usually above about 0° and up to 105° C., preferably about 5°-50° C. and more preferably is ambient or room temperature (i.e., about 18°-25° C.). The aqueous phase in vessel 25 is transferred via a line (not shown) to vessel 34 and is then processed as is described above for FIG. 2.

The particulates in vessel 23 are treated in FIG. 13 as shown in FIG. 2 and as described above for FIG. 2.

The double alkali process is often preferred because calcium carbonate (usually limestone) is fairly cheap, and the pollution control industry has experience in dealing with the products: $CaSO_4$ and $CaSO_3$.

Production of Cysteine from Cystine

Figure 3:
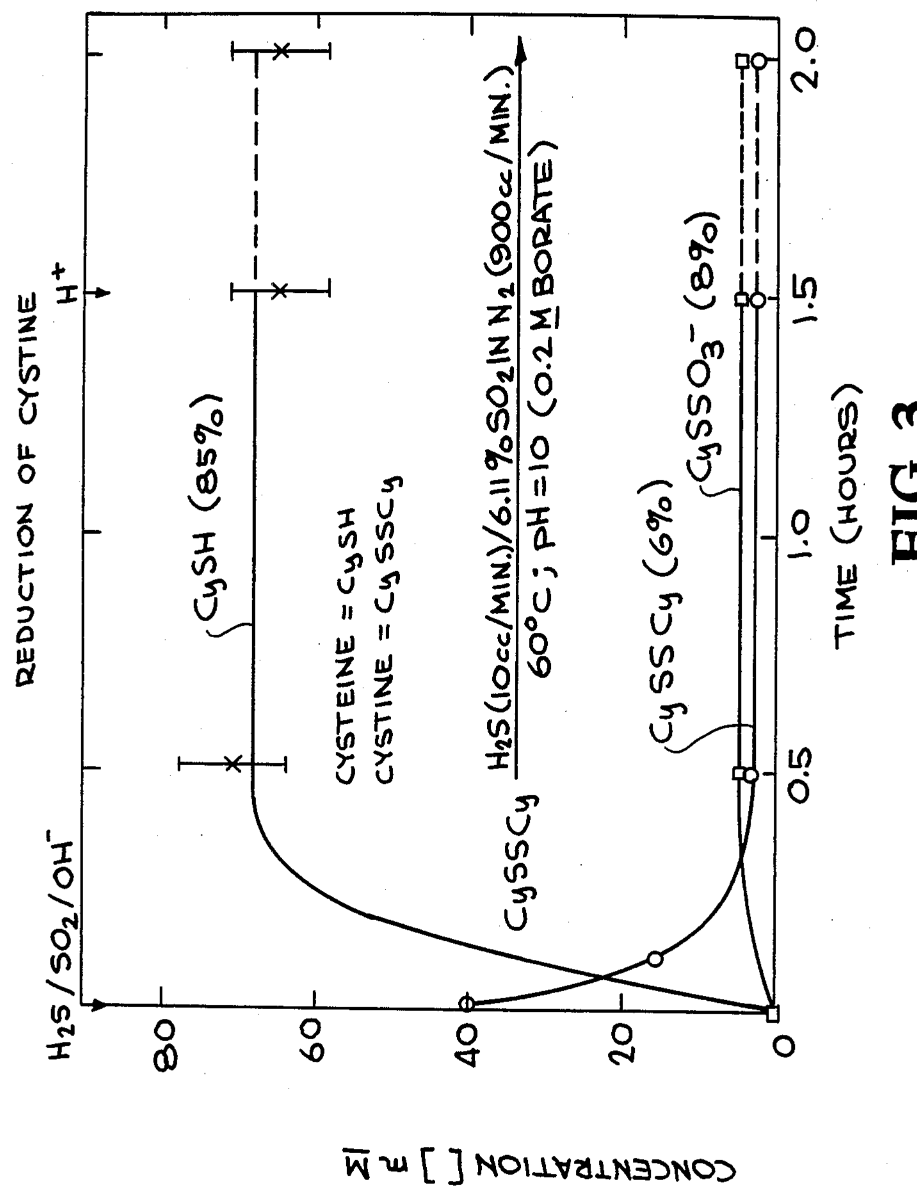
FIG. 3 shows results of the reduction of cystine using a mixture of hydrogen sulfide and sulfur dioxide.
Figure 4:
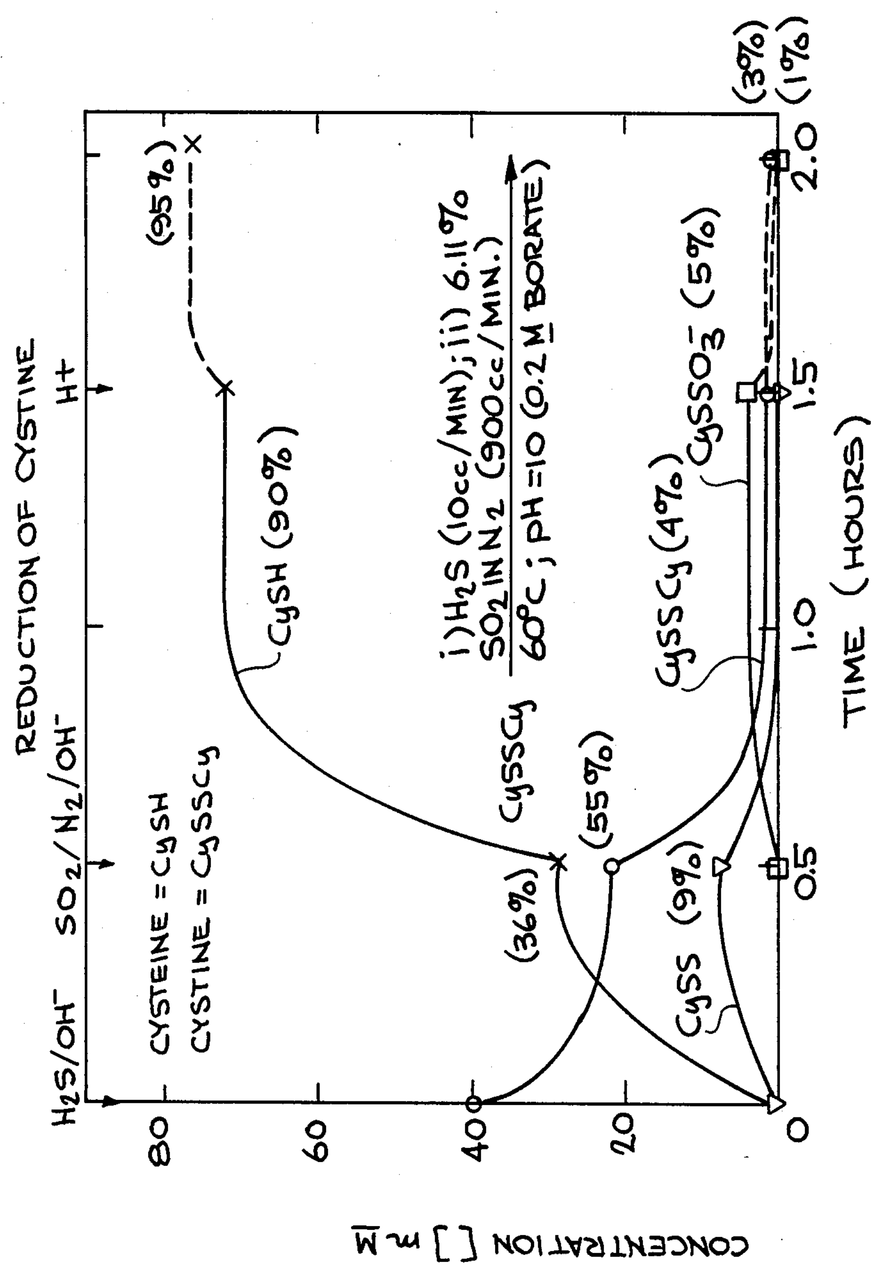
FIG. 4 shows the results of the sequential reduction of cystine first with hydrogen sulfide then using sulfur dioxide added about ½ hour later.
Figure 5:
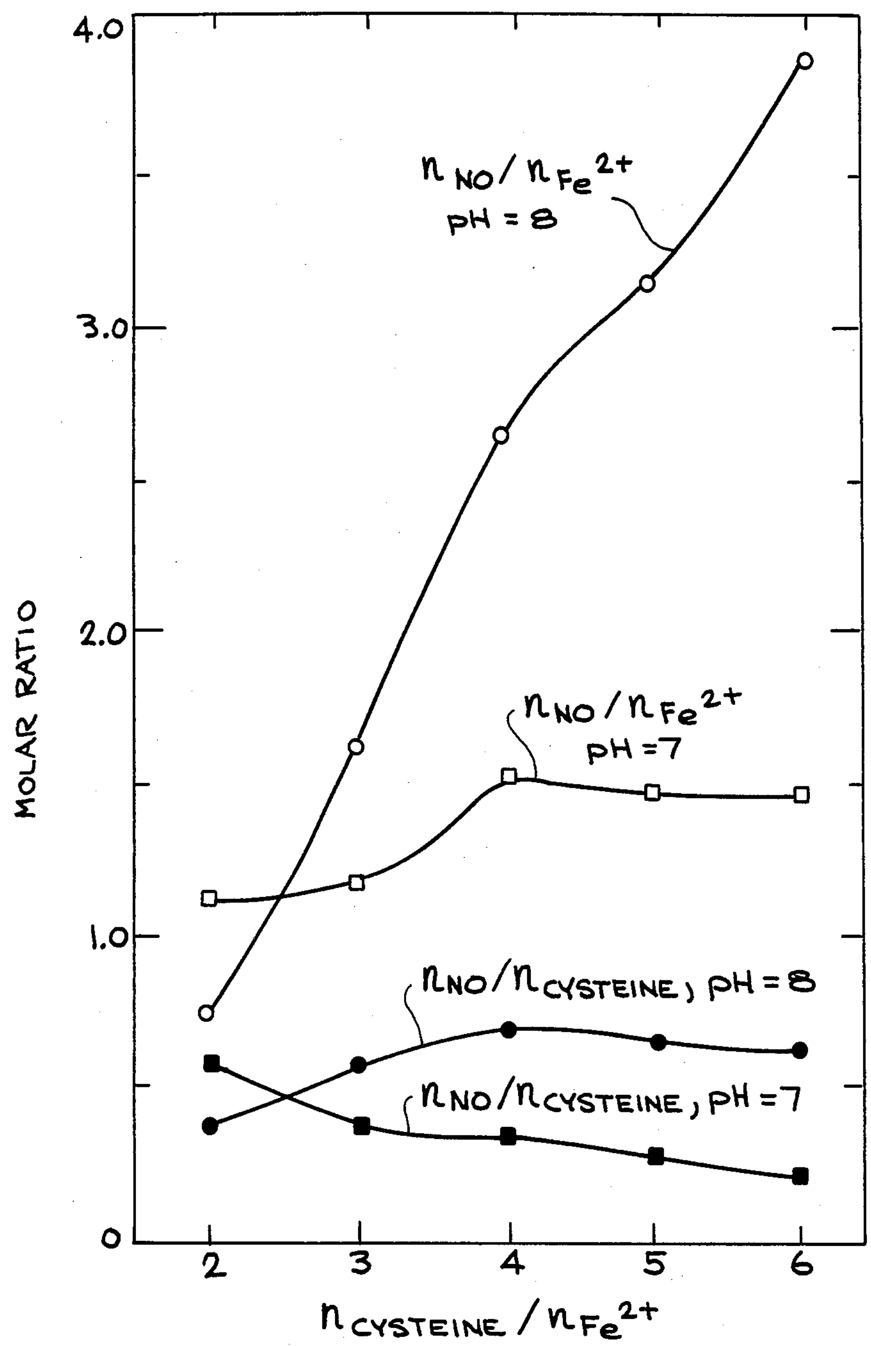
FIG. 5 shows the effect of molar ratio of cysteine to ferrous ion on the absorption of NO in solutions at pH 7 and 8 at 55° C.

Cystine is slightly soluble in aqueous solutions in the range of about pH 2–8 and is substantially more soluble at either more acidic or basic solutions. Therefore, it is advantageous to reduce cystine to cysteine either at basic pH, i.e., above about 9 or preferably a pH above about 10 or 11, or very acidic pH solutions, i.e., at a pH below about 2 and preferably between about 1–2. The basic cystine solutions may be prepared by dissolving cystine with aqueous solutions containing alkalis. The monomeric cysteine can be produced by treating the basic cystine solutions with $H_2S$ (or alkali metal sulfides) and $SO_2$ (or alkali metal sulfite/alkali metal bisulfites) either simultaneously (FIG. 3) or alternatively (FIG. 4). To obtain optimum results, the solutions should be controlled at pH 9–12 using buffer reagents (i.e., alkali metal borate, such as sodium borate) or by adding the alkali metal compounds into the solutions. This pH range substantially reduces the reaction between $H_2S$ and $SO_2$ and provides for effective use of the chemical reagents.

The acidic cystine solutions may be prepared by dissolving cystine in aqueous solutions and made acidic to a pH below about 2 with a compatible acid such as a mineral acid like $H_2SO_4$ or the cystine solution is bubbled with flue gas containing $SO_2$ without first acidifying it with a mineral acid. The monomeric cysteine can be produced by the treatment of this acidic cystine solution with alkalis such as $Na_2B_4O_7$, NaOH or soda ash to bring pH to above 9 before adding $H_2S$ (or sulfides).

The resulting solutions containing cysteine and thiosulfate may be neutralized to pH of about 7–8 with flue gas containing $SO_2$ before recycle in the present scrubber system. The neutralization ensure the consumption of sulfide species by bisulfite ion to avoid the formation of pyrite (FeS) in the system. The sulfide ion can react with ferrous ion to produce black pyrite precipitate. Therefore, for the purpose of recycling in scrubber systems, care must be taken such that the concentration of $SO_2$ (or sulfite/bisulfite) employed should be slightly more than that of $H_2S$ (or sulfides) to avoid the presence of unused sulfide ion in the system prior to recycle. The concentration of $SO_2$ is monitored by conventional means, e.g., such as a pulse fluorescent $SO_2$ analyzer. Cysteine in reagent grade solid form may be obtained by crystallization from the solutions. This method may also be used for production of cysteine from naturally occurring biochemical products containing amino acids, for example cystine from animal fur or hair from other natural sources.

The following reaction schemes describe the production of cysteine from cystine:

$$\text{CYSSCY} + \text{HS}^- \rightleftharpoons \text{CYSH} + \text{CYSS}^-$$

$$\text{CYSS}^- + \text{HS}^- \rightleftharpoons \text{CYSH} + \text{S}_2^{2-}$$

-continued $$\text{CYSS}^- + \text{HSO}_3^{2-} \xrightarrow{H^+} \text{CYSH} + \text{S}_2\text{O}_3^{2-}$$

$$\text{CYSSCY} + \text{HSO}_3^- \rightleftharpoons \text{CYSH} + \text{CYSSO}_3^-$$

$$\text{CYSSO}_3^- + \text{HS}^- \longrightarrow \text{CYSH} + \text{S}_2\text{O}_3^{2-}$$

$$2\text{HS}^- + 4\text{HSO}_3^- \longrightarrow 3\text{S}_2\text{O}_3^{2-} + 3\text{H}_2\text{O}$$

Where CYSH, CYSSCY, $CYSS^-$, and $CYSSO_3^-$ represent cysteine, cystine, S-thiocysteine, and cysteine sulfonate respectively.

The following examples are intended to be illustrative only and are not intended to be limiting in any way.

EXAMPLES 1–4C

(Table 4 Method I to IVc)

Cysteine

Figure 6:
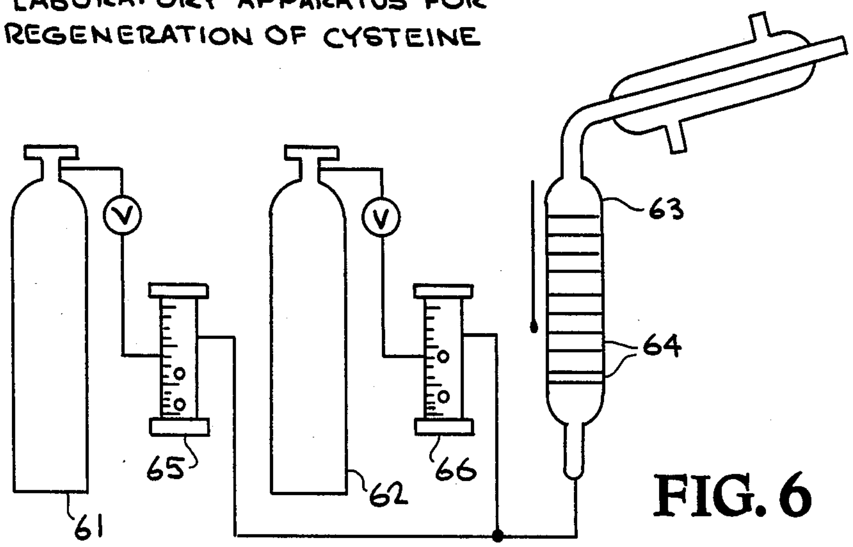
FIG. 6 shows the laboratory experimental apparatus for the regeneration of cysteine.

Experiments were carried out at several different conditions using the apparatus shown in FIG. 6. $H_2S$ and $SO_2$ were introduced into aqueous cystine solutions either simultaneously or in sequence. In separated runs, $Na_2S$ and $Na_2SO_3$, instead of $H_2S$ and $SO_2$ were employed. In experiments using $H_2S$ (Vessel 61) and $SO_2$ (Vessel 62) gases, the concentrations of species were: cystine 40 mM, $H_2S$ 40 mM, and $SO_2$ 220 mM; in those runs using sodium salts of sulfide and sulfite, the concentrations were: cystine 10 mM, $Na_2S.9H_2O$, 20 mM, and $Na_2SO_3$ 30 mM. The temperature and pH dependence of reactions were studied at 60° C. and 80° C., and pH 10 and 12.

A general experimental procedure is outlined below for the case where the pH of the solution is 10, the reaction temperature is 60° C., and $H_2S$ (Vessel 61) and $SO_2$ (Vessel 62) gases were applied simultaneously. In 200 mL borate buffer (0.2M $Na^+$; pH=10.0) at 55° C. was dissolved 1.923 gm cystine (40 mM). The solution was then poured into a Pyrex reaction column 63 (50 mm ID×210 mm) equipped with a porous sintered glass filter at the bottom and heating tape 64. The cystine solution was allowed to equilibrate at 60° C., and a 1.0 mL aliquot was taken, diluted with citrate buffer (0.2M $Na^+$; pH=3.25), and analyzed by an amino acid analyzer. $H_2S$ and $SO_2$ (6.11% in $N_2$) were bubbled through the cystine solution for a total of 20 min. The concentration of the $SO_2$ was monitored by a pulse fluorescent $SO_2$ analyzer, available from the Thermoelectron Corporation. The flow rates of the gases were controlled by flow-meters 65 and 66 and were 10 mL/min for $H_2S$ and 900 mL/min for $SO_2/N_2$. The pH of the solution was monitored periodically by the use of a pH meter, and NaOH was added to restore the pH to 10 when necessary. Aliquots of the reaction mixture were withdrawn at designated time intervals, diluted with the above citrate buffer, and analyzed for cystine, cysteine, cysteine-sulfonate and S-thiocysteine by amino acid analysis. The concentration of S-thiocysteine was also monitored by UV-visible spectroscopy. After the reaction had reached equilibrium, the reaction mixture was neutralized to pH 7 by dropwise addition of concentrated $H_2SO_4$. After 30 min., 5.0 mL aliquot of this solution was added to equal volume of a saturated iron (II) solution to determine if any $HS^-$ was present. The results are in FIG. 3.

In the experiments where $H_2S$ gas was introduced first, followed by $SO_2/N_2$, (FIG. 4), the same flow rates of each gas were used. In the cases where $Na_2S$ $9H_2O$ and $Na_2SO_3$ were used, the concentration of the cystine solution was 10 mM. The chemical reagents were added either in sequence ($Na_2S.9H_2O$ first, followed by $Na_2SO_3$) or simultaneously at concentrations of 20 mM and 30 mM, respectively.

The results for the regeneration of cysteine from cystine are presented in Table 4.

TABLE 4

| METHOD [1] | pH | T°(°C.) | % CySH[2] | % $(CySSO_3^-)$[3] | % CySSCy[4] |
|---|---|---|---|---|---|
| I | 10 | 60 | 59 | 17 | 15 |
| II | 10 | 60 | 36 | 3 | 58 |
| III | 10 | 60 | 90 | 5 | 4 |
| IV a | 10 | 60 | 85 | 8 | 6 |
| IV b | 10 | 80 | 84 | 10 | 6 |
| IV c | 12 | 60 | 84 | 6 | 5 |

[1]See Text
[2]CySH = Cysteine
[3]$CySSO_3^-$ = Cysteine-Sulfonate
[4]CySSCy = Cystine When a 10 mM cystine solution at pH 10 and 60° C. was allowed to react first with 2 equivalent of $Na_2S$ $9H_2O$ followed by 3 equivalents of $Na_2SO_3$ (Method I), the reaction reached equilibrium in 30 min with 59% cysteine (CYSH), 17% cysteinesulfonate ($CYSSO_3^-$) and 15% cystine (CYSSCY). The important finding is that no more $HD^-$ remained in the reaction mixture after neutralization as evidenced by the absence of black FeS precipitate upon addition of the reaction mixture to a iron (II) solution. This is attributed to the reaction of $HS^-$ and $HSO_3^-$ to form $S_2O_3^{2-}$ at pH 7 and 60° C.

The simultaneous addition of $Na_2S$ $9H_2O$ and $Na_2SO_3$ to cystine at the same concentrations as above (Method II) yielded less CYSH (36%) and much of the CYSSCY (58%) is unreacted. This is presumably due to the reaction of $HS^-$ and $SO_3^{2-}$ which occurred at an appreciable rate at 60° C. Again, no $HS^-$ was found after the solution was neutralized.

The best results obtained are from the sequential reaction of cystine first with gaseous $H_2S$ and then $SO_2/N_2$ at pH 10 and 60° C. (Method III, FIG. 4). In this case, a 90% yield of cysteine is attained, together with small amounts of $CYSSO_3^-$ (5%) and unreacted CYSSCY (4%). When $H_2S$ and $SO_2/N_2$ are applied simultaneously under the same reaction conditions (Method IV a), CYSH is obtained in 85% yield. Again, this discrepancy may be due to the reaction of $HS^-$ and $SO_3^{2-}$ at 60° C.

The effect of temperature and pH on the reaction were demonstrated in Method IV b and IV c respectively. Raising the reaction temperature to 80° C. did not affect the yield of CYSH (Method IV b). However, the equilibrium was achieved in about 15 min. (vs. about 30 min. for reaction at 60° C.). Finally, changing the pH to 12 also had no effect on the equilibrium concentrations of CYSH, $CYSSO_3^{31}$, and CYSSCY (Method IV c).

It should be noted that the concentrations of $HS^-$ and $SO_3^{2-}$ in the reaction of cystine with $H_2S$ and $SO_2/N_2$ (Method III, IV a, IV b, and IV c) were approximately 40 mM and 220 mM respectively. Also, no $HS^-$ was detected and no change in equilibrium concentrations occurred upon neutralization to pH 7.

EXAMPLES 5 AND 6

Penicillamine and N-Acetylcysteine

In a similar manner, it was learned that penicillamine ($\beta$, $\beta$-dimethylcysteine), $HO_2CCH(NH_2)C(CH_3)_2SH$ and N-acylcysteines, preferably N-acetylcysteine, $HO_2CCH(NHCOCH_3)CH_2SH$, also perform well in conjunction with ferrous salts and alkali (such as borate) in aqueous solutions to remove $NO_x$ and $SO_2$ from flue gas.

Figure 7:
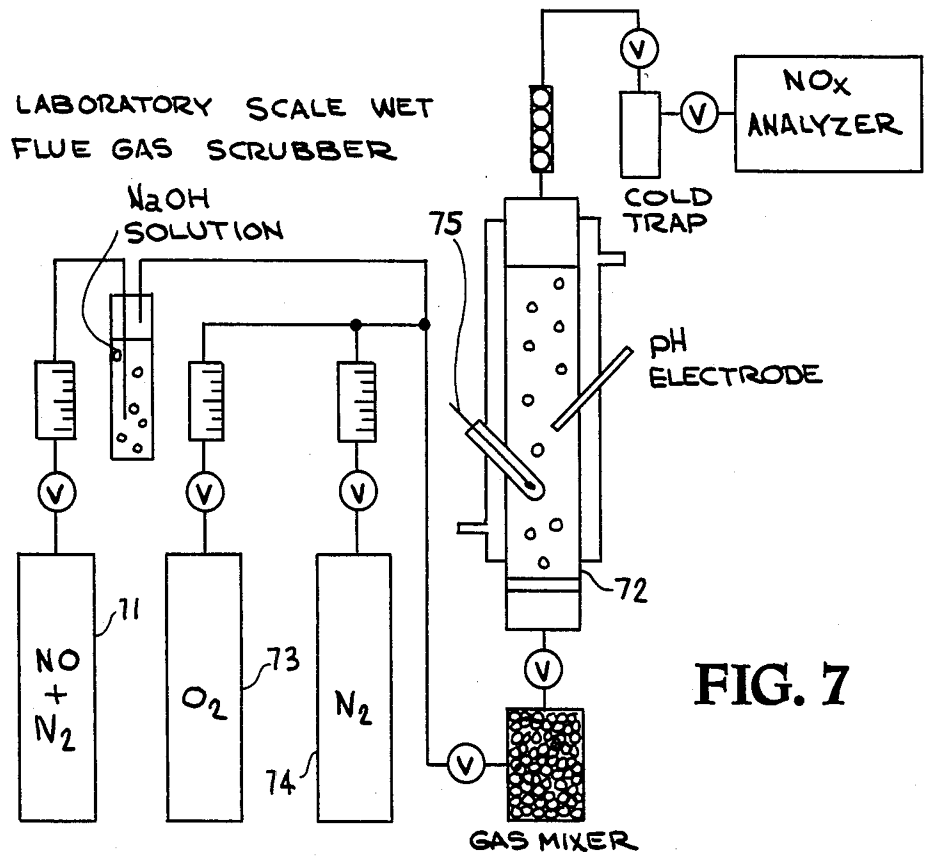
FIG. 7 shows a schematic diagram of a laboratory-scale wet flue gas scrubber.

The experimental arrangement shown in FIG. 7 was used. First gaseous NO and $N_2$ ($P_{NO}$=500–1000 ppm) is bubbled into an absorber (72) containing aqueous solutions of ferrous salt and penicillamine (or N-acetylcysteine). The results are shown in FIG. 8.

In the second set of experiments, a simulated flue gas composed 500 ppm NO and 4% oxygen (73) in $N_2$ (74) is bubbled into a solution of ferrous N-acylcysteine or ferrous penicillamine. The concentrations of $Fe^{2+}$ and penicillamine or N-acylcysteine were $10^{-2}$–$10^{-3}$M and $10^{-1}$–$10^{-2}$M, respectively. The pH of the solution is varied between 7 and 12 using sodium borate buffers adjusted to the desired pH values with sodium hydroxide or sulfuric acid. The NO concentration in the outlet gas is measured using a chemiluminescent analyzer. The volume and temperature of the aqueous solutions are 200 ml and 55° C. respectively. The flow rate of the gaseous mixtures is about 750°±100 ml/min.

Figure 8:
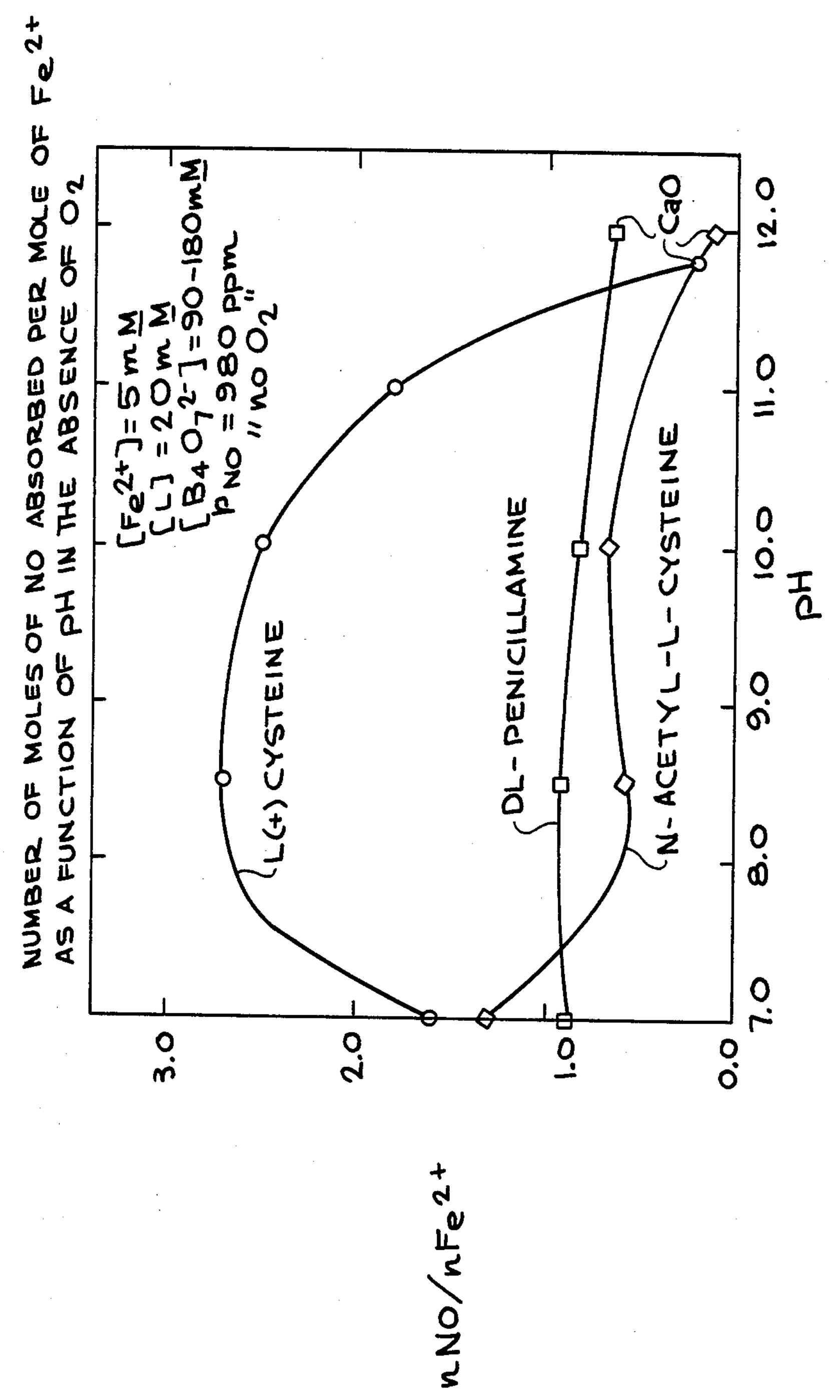
FIG. 8 shows the effect of pH on the absorption of NO in aqueous solutions containing ferrous chelate with molar ratio of chelate to ferrous ion of 4 and at 55° C. between pH values of 6 and 12, where the chelates are L(+)-cysteine, DL-penicillamine, and N-acetyl-L-cysteine.

The results of the experiments where the gas mixtures contain no $O_2$ are shown in FIG. 8. The number of moles of NO absorbed per mole of $Fe^{+2}$ in a ferrous penicillamine or ferrous acetyl cysteine solution increases slightly as the solutions become more acidic. For comparison, the absorption of NO by ferrous cysteine is shown.

Figure 9:
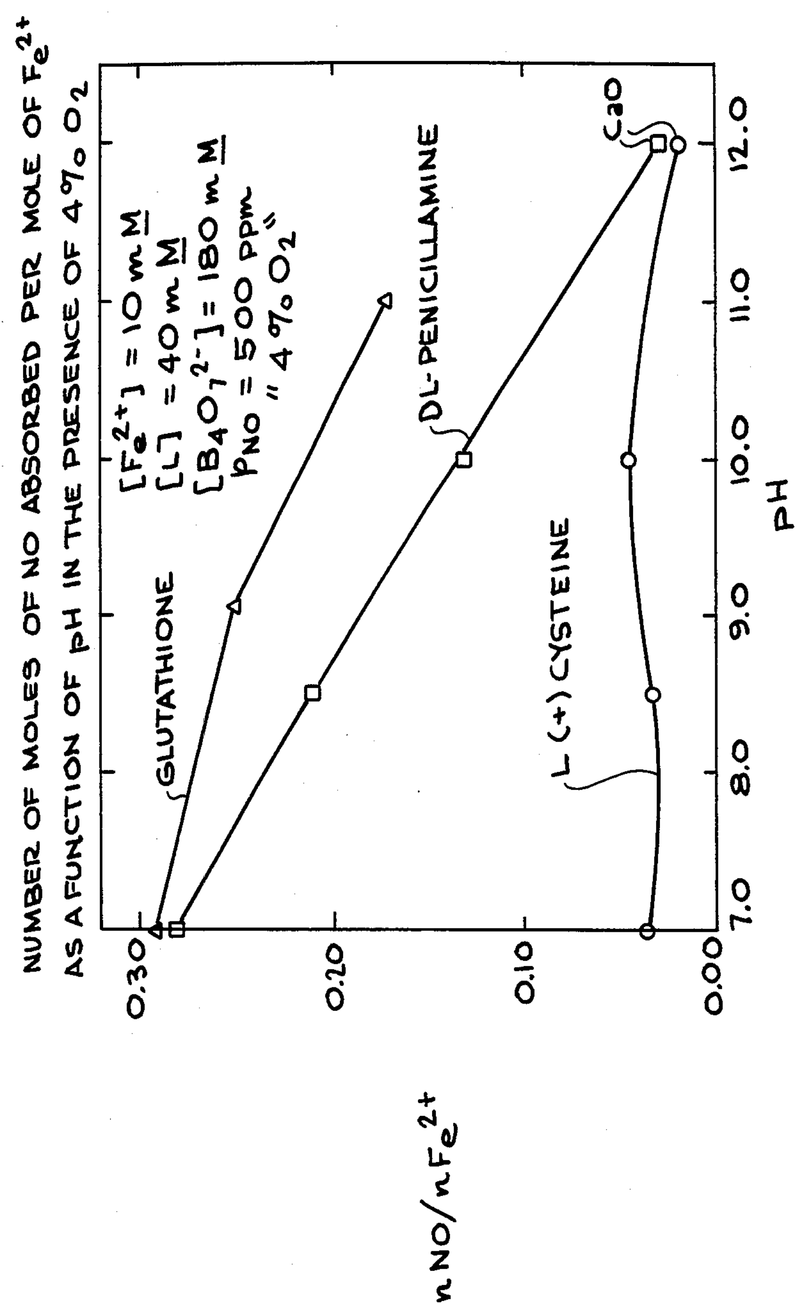
FIG. 9 shows the effect of pH on the absorption of NO in aqueous solutions containing ferrous chelate with a molar ratio of ligand (L), [L=cysteine, DL-penicillamine, or glutathione], to ferrous ion of 4 at 55° C. between pH values of 7 and 12 in the presence of 4% oxygen.

The results of the experiments using simulated flue gas containing 4% oxygen are shown in FIG. 9. There is a substantial reduction in NO absorption, compared to the case where there is no oxygen in the gas mixture.

The effectiveness of NO absorption in the absence of oxygen in flue gas and over most of the pH range 7–12 of the solutions follow the order:

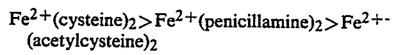

$$Fe^{2+}(\text{cysteine})_2 > Fe^{2+}(\text{penicillamine})_2 > Fe^{2+}\text{-}(\text{acetylcysteine})_2$$

However in the presence of 4% oxygen in the flue gas, the NO absorption capacity is greater in ferrous penicillamine than ferrous cysteine (or N-acylcysteine) solutions. It is believed this result is because $Fe^{2+}$ (penicillamine)$_2$ is more stable toward oxidation than $Fe^{2+}$ (cysteine)$_2$ under these experimental conditions.

EXAMPLE 7

Glutathione

In a similar manner to that described above for penicillamine, the peptide glutathione (glutamylcysteinylglycine) is used in conjunction with ferrous salts and alkali (such as borate) in aqueous solutions, effectively removes $NO_x$ and $SO_2$ from flue gas. The pH range is over 5–11 using the same experimental apparatus shown in FIG. 7, the results of the experiments are shown in FIG. 9.

In the presence of 4% oxygen in flue gas, as shown in FIG. 10, the effectiveness of NO absorption in the solutions follow the order:

$Fe^{2+}$(glutathione) > $Fe^{2+}$(penicillamine)$_2$ > $Fe^{2+}$-(cysteine)$_2$ This observation is attributed to the fact that $Fe^{2+}$ (glutathione) is more stable towards oxidation than $Fe^{2+}$ (cysteine)$_2$ under the experimental conditions. It appears that the rate of absorption/reaction of NO with ferrous glutathione is slower than that observed with ferrous penicillamine and ferrous cysteine.

Overall, in the present invention, it appears that peptides of two or more amino acids are more stable to oxidation in Step (A) [or step (a)] at lower pH values. Therefore, glutathione is particularly effective from pH of 5–11. Cysteine, N-acetylcysteine, and penicillamine are effective at pH of between about 6–11, preferably pH of between 6.5 and 11.

The present processes are particularly useful in that the usual production of dithionate is substantially reduced or eliminated under the present conditions.

In the contacting zone in step (A), (a) or (AA) the liquid droplet containing the chelate, etc. contacts the hot gases. A thin film of water is present on the droplet for about one second (direct duct injection) about two seconds (spray drying) during which the formation of the NO compound and subsequent reduction occurs. The time to vaporize the water and to form the solid particulates is dependent upon the temperature, e.g., higher temperatures produce shorter times. After the solid particle is formed, generally little further reaction occurs.

Generally, good results are obtained when the ferrous ion concentration is between about 0.01 and 1 mole per liter of solution in step (A), (a) or (AA). Also the stoichiometric molar ratio of amino acid moiety (e.g., cysteine) to ferrous ion is between about 25 to 1. The stoichiometric molar ratio of alkali to $SO_2$ is usually between about 0.5 and 3. The stoichiometric molar ratio of ferrous ion to $NO_x$ is usually between about 0.25 and 25.

The alkali (e.g., $Na_2B_4O_7$, NaOH, soda ash) present in the original slurry in step (A), (a) or (AA) is sufficient to obtain a desired pH, between about 5 and 11.

While some embodiments of the present invention have been shown and described herein, it will be apparent to those skilled in the art that various modifications and changes can be made in the disclosed processes to remove $NO_x$ and $SO_2$ from fluids, to produce cysteine from cystine and the use of a spray drying process to remove $NO_x$ and $SO_2$ from flue gas without departing from the spirit and scope of the present invention. All such modifications and changes coming within the scope of the appended claims are intended to be covered thereby.

What is claimed is:

1. A process of the simultaneous removal of $NO_x$ and $SO_2$ from a fluid stream itself comprised of $NO_x$ and $SO_2$, which process comprises:

(A) contacting the fluid stream in a contacting zone with an aqueous reaction mixture itself comprising an effective amount of an iron (II) chelate of an amino acid moiety having at least one —SH group selected from amino acids, N-substitued amino acids, natural peptides and synthetic peptides, and an alkali which comprises a basic salt selected from the salts of sodium, potassium, lithium, calcium or magnesium;

(B) separating the fluid stream from the particulates formed in step (A) which particulates comprise the chelate of the amino acid moiety and fly ash;

(C) washing with the particulates of step (B) with a relatively neutral aqueous solution having a pH of between about 5 and 8 with subsequent separation of the aqueous wash and the particulates;

(D) subsequently washing the particulates of step (C) with an acidic aqueous solution of a mineral acid having a pH of between 1 to 3 with separation of the aqueous wash and the particulates;

(E) washing of the particulates of step (D) with an alkaline aqueous solution having a pH of between about 9 and 12 with subsequent separation of the aqueous wash and the particulates;

(F) adding additional amino acid moiety, iron (II) ion, and an alkali which comprises a basic salt selected from the salts of sodium potassium, lithium, calcium or magnesium to produce an effective concentration of chelating aqueous solution or slurry having a pH of between about 4 to 12; and (G) recycling the aqueous solution of step (F) to the contacting zone of step (A).

2. The process of claim 1 which further includes step (C-1) after (C) and before step (D) wherein the aqueous wash of step (C) includes sodium borate, sodium sulfite, sodium sulfate and sodium nitrate which are each separated by conventional means and the sodium borate is combined with additional amino acid moiety and iron (II) ion for recycle to the contact zone of step (A); and step (E-1) after step E and before step (F) wherein the aqueous wash of step (E) includes dimeric amino acid moiety which is treated with sulfite and sulfide ions to produce the monomeric amino acid moiety combined with additional iron (II) ion and alkali metal borate and recycled to the contacting zone of step (A); and step (F) is performed.

3. The process of claim 1 wherein the temperature of the contacting zone in step (A) is between about 105° and 180° C.

4. The process of claim 3 wherein the amino acid moiety is cysteine.

5. The process of claim 1 wherein the amino acid moiety is glutathione.

6. The process of claim 1 wherein the amino acid moiety is N-acyl cysteine wherein the acyl group is acetyl.

7. The process of claim 1 wherein the amino acid moiety is penicillamine.

8. The process of claim 1 wherein in step (A) the reaction solution comprises a borate buffer or soda ash.

9. The process of claim 8 wherein the temperature of the fluid in step (A) is between about 105° and 180° C.

10. The process of claim 8 wherein the flue gas is bubbled into an aqueous liquid at between 60° and 80° C.

11. The process of claim 9 wherein the amino acid moiety is cysteine.

12. The process of claim 9 wherein the amino acid moiety is N-acetylcysteine or penicillamine.

13. The process of claim 9 wherein the amino acid moiety is glutathione.

14. The process of claim 2 wherein in step (A) the pH of the aqueous slurry is between about 4 and 12.

15. The process of claim 14 wherein in step (A) the flue gas is bubbled into an aqueous liquid.

16. The process of claim 14 wherein:

in step (A) the temperature of the fluid is between about 120°–150° C.;

in step (C) the aqueous solution is water at pH of about 7;

in step (D) the aqueous solution comprises $SO_2$ in water at a pH of between 2 and 3; and in step (F) the aqueous solution is a sodium borate buffer at a pH of between 10 and 11.

17. The process of claim 16 wherein the amino acid moiety is cysteine.

18. The process of claim 16 wherein the amino acid moiety is selected from N-acyl cysteine or, penicillamine.

19. The process of claim 16 wherein the amino acid moiety is N-acylcysteine wherein the acyl is acetyl.

20. The process of claim 16 wherein the amino acid moiety is glutathione.

21. The process of claim 16 wherein the amino acid moiety is selected from cysteine, N-acetylcysteine, and penicillamine and in step (A) the pH value is between about 6.5 and 11.

22. The process of claim 1 wherein the amino acid moiety is selected from natural or synthetic peptides having about 1 to 3 amino acid groups.

23. The process of claim 22 wherein each amino acid of the peptide is independently substituted or unsubstituted.

24. The process of claim 23 wherein an amino acid of the peptide is substituted by an N-acyl group, wherein the acyl group has from 2 to 10 carbon atoms.

25. The process of claim 24 wherein the acyl group is an acetyl

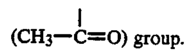

26. The process of claim 1 wherein in step (a) the contacting zone is a spray drying zone.

27. The process of claim 1 wherein in step (a) the contacting zone is an aqueous reaction mixture of the iron (II) chelate of the amino acid moiety wherein the fluid stream is bubbled into the aqueous reaction mixture.

28. The process of claim 1 wherein in step (a) in the contacting zone the aqueous solution is direct duct injected into the fluid containing $NO_x$ and $SO_2$.

29. In a process for removing $NO_x$ and $SO_2$ from a gas stream containing same by contacting said stream with a mixture of iron (II) chelate of an amino acid moiety having at least one—SH group said amino acid moiety selected from amino acids, N-substituted amino acids, natural peptides and synthetic peptides and an alkali which comprises a basic salt selected from the salts of sodium potassium, lithium, calcium or magnesium to form $NO_x$ and $SO_2$ contaminated iron (II) amino acid chelate and alkali, the improvement consisting of:

(1) recovering a mixture of solids of the $NO_x$ and $SO_2$ contaminated mixture of said iron (II) amino acid chelate and alkali metal compound;

(1—1) heating said solids to a temperature in the range of about 75° to 200° C. to desorb NO;

(2) washing said solids with a relatively neutral aqueous solution and separating said solids from the aqueous liquid;

(3) subjecting the solids from step (2) to at least two additional sequential treatments comprising washing with one of an acidic aqueous solution of a mineral acid or an alkaline aqueous solution followed by washing the separated solids with the other of said acid or alkaline aqueous solutions;

(4) adding additional amino acid moiety, iron (II) and alkali to the separated acid wash then adding said aqueous mixture to a gas stream for removal of $NO_x$ and $SO_2$;

(5) alkali metal sulfite may be separated from the separated aqueous neutral wash of step (2);

(6) adding the separated aqueous wash from the neutral washing of step (2) to the mixture of step (4);

(7) the separated aqueous wash from the alkaline wash which contains dimeric amino acid is treated with alkali metal sulfite and sulfides to produce the monomeric amino acid which can be used in forming iron (II) amino acid chelate for use in removing $NO_x$ and $SO_2$ from gas streams.

30. The process of claim 29 wherein the recovered mixture of solids or particulates in step (1) comprise the iron chelate of the amino acid moiety, alkali and fly ash; and which particulates are treated as follows:

(2) washing the particulates of step (1) with a relatively neutral aqueous solution having a pH of between about 5 and 8 with subsequent separation of the aqueous wash and the particulates;

(3) treating the aqueous wash of step (2) with calcium carbonate to form calcium salts including calcium sulfite and calcium sulfate;

(4) separating the solid calcium sulfite and calcium sulfate particulates formed in step (3) from the aqueous solution containing said alkali from step (2); and (5) recycling the aqueous solution of step (4) to step (7);

(6) washing the particulates of step (1) with an aqueous solution having a pH of between about 1 and 3 with subsequent separation of the aqueous wash and the particulates; and (7) to the separated liquid wash form step (6) adding additional amino acid moiety, iron (II) ion, and alkali to produce an effective chelating aqueous solution or slurry having a pH of between about 5 and 11;

(8) recycling the aqueous solution of step (7) to the treating zone of fluid streams for removal of $NO_x$ and $SO_2$;

(9) washing the particulates from step (6) with an alkaline aqueous solution having a pH of between about 9 and 12 and then separating the aqueous wash containing dimeric amino acid and the particulates containing fly ash; and

(10) recycling the wash containing dimeric amino acids to a vessel for cleaving and reducing the dimeric acid to the monomeric form.

31. A process for the removal of $NO_x$, $SO_2$ and particulates from a fluid stream, which process comprises:

(a) injecting into a contact zone an aqueous solution or slurry itself comprising:

(i) an amino acid moiety selected from cysteine, gluthione, penicillamine or N-acylcysteine, wherein the N-acyl group has from 2 to 10 carbon atoms;

(ii) iron (II) ion; and (iii) an alkali which comprises a basic salt selected from the salts of sodium, potassium, lithium, calcium or magnesium wherein the aqueous solution has a pH of between about 4 and 12, and forming particulates;

(b) collecting and washing the particulates of step (a) with an aqueous solution having a pH of between about 5 and 8 followed by separation of the aqueous wash and the particulates;

(c) washing the particulates of step (b) with an acidic aqueous solution of a mineral acid having a pH value of between about 1 and 3 with subsequent separation of the aqueous wash and the particulates;

(d) washing the particulates of step (c) with an alkaline aqueous solution having pH value of between about 9 and 12 with subsequent separation of the aqueous wash and the particulates;

(e) discarding the particulates of step (d); and (f) recycling the aqueous solution of step (d) to the aqueous solution or slurry of step (a) after first cleaving and reducing the dimeric amino acid compound to the monomeric form.

32. The process of claim 31 wherein in step (a) the amino acid moiety is selected from cysteine, penicillamine or N-acylcysteine wherein N-acyl is N-acetyl and the pH of the solution is between about 6 and 12.

33. The process of claim 31 wherein in step (a) the amino acid moiety is glutathione and the pH of the solution is between about 4 and 12.

34. A process for the simultaneous removal of $NO_x$ and $SO_2$ from a fluid stream comprised of $NO_x$ and $SO_2$, which process comprises:

(AA) contacting the fluid stream in a contacting zone with an aqueous reaction mixture itself comprising an effective amount of iron (II) chelate of an amino acid moiety having at least one —SH group said amino acid moiety being selected from amino acids, N-substituted amino acids, natural peptides and synthetic peptides;

(BB) separating the fluid stream from the particulates formed in step (AA) which particulates comprise the iron chelate of the amino acid moiety, alkali which comprises a basic salt selected from the salts of sodium, potassium, lithium, calcium or magnesium and fly ash;

(CC) washing the particulates of step (BB) with an aqueous solution having a pH of between about 5 and 8 with subsequent separation of the aqueous wash and the particulates;

(DD) treating the aqueous wash of step (CC) with calcium carbonate to form calcium salts including calcium sulfite and calcium sulfate;

(EE) separating the solid calcium sulfite and calcium sulfate particulates formed instep (DD) from the aqueous solution containing said alkali from step (BB); and (FF) recycling the aqueous solution of step (EE) to step (HH);

(GG) washing the particulates of step (BB) or step (BB-1) with an aqueous solution having a pH of between about 1 and 3 with subsequent separation of the aqueous wash and the particulates; and (HH) to the separated liquid was from step (GG) adding additional amino acid moiety iron (II) ion, and alkali to produce an effective chelating aqueous solution or slurry having a pH of between about 5 and 11;

(JJ) recycling the aqueous solution of step (HH) to the contacting zone of step (AA);

(KK) washing the particulates from step (GG) with an alkaline aqueous solution having pH of between about 9 and 12 and then separating the aqueous wash containing dimeric amino acid and the particulates containing fly ash; and (LL) recycling the wash containing dimeric amino acids to a vessel for cleaving and reducing the dimeric acid to the monomeric form.

35. The process of claim 34 which further includes step (EE-1) after (EE) and before step (FF) wherein the aqueous solution of step (EE) includes sodium borate, sodium sulfite and sodium nitrate and which sodium borate are each separated by conventional means and the sodium borate is combined with additional amino acid moiety and iron (II) ion for recycle to the contact zone of step (AA); and step (FF) is performed.

36. The process of claim 34 wherein the temperature of the contacting zone in step (AA) is between about 105° and 180° C.

37. The process of claim 36 wherein the amino acid moiety is selected from amino acids, N-substituted amino acids, natural peptides and synthetic peptides.

38. The process of claim 37 wherein the amino acid moiety is selected from cysteine, glutathione, N-acyl cysteine or penicillamine.

39. The process of claim 37 wherein the temperature in step (AA) is between about 120° and 150° C.

40. A process for the simultaneous removal of $NO_x$ and $SO_2$ from a fluid stream itself comprised of $NO_x$ and $SO_2$, which process comprises:

(A) contacting the fluid stream in a contacting zone with an aqueous reaction mixture itself comprising an effective amount of an iron (II) chelate of an amino acid moiety having at least on —SH group selected from amino acids, N-substituted amino acids, natural peptides and synthetic peptides and an alkali which comprises a basic salt selected from the salts of sodium, potassium, lithium, calcium or magnesium;

(B) separating the fluid stream from the particulates formed in step (A) which particulates comprise the chelate of the amino acid moiety and fly ash;

(C) washing with the particulates of step (B) with a relatively neutral aqueous solution having a pH of between about 5 and 8 with subsequent separation of the aqueous wash and the particulates;

(D) subsequently washing the particulates of step (C) with an acidic aqueous solution of a mineral acid having a pH of between 1 to 3 with separation of the aqueous wash and the particulates;

(E) washing of the particulates of step (D) with an alkaline aqueous solution having a pH of between about 9 and 12 with subsequent separation of the aqueous wash and the particulates;

(F-1) producing an effective concentration of chelating solution or slurry having a pH of between about 4 to 10; and (G) recycling the aqueous solution of step (E) to the contacting zone of step (A).

41. In a process for removing $NO_x$ and $SO_2$ from a gas stream containing same by contacting said stream with a mixture of iron (II) chelate of an amino acid moiety having at least one—SH group, wherein said amino acid moiety is selected from amino acids, N-substituted amino acids, natural peptides or synthetic peptides, and an alkali wherein said alkali comprises a basic salt selected from the salts of sodium, potassium, lithium, calcium or magnesium, to form $NO_x$ and $SO_2$ contaminated iron (II) amino acid chelate and alkali, the improvement consisting of:

(1) recovering a mixture of solids of the $NO_x$ and $SO_2$ contaminated mixture of said iron (II) amino acid chelate and alkali metal compound;

(2) washing said solids with a relatively neutral aqueous solution and separating said solids from the aqueous liquid;

(3) subjecting the solids from step (2) to at least two additional sequential treatments comprising washing with one of an acidic aqueous solution of a mineral acid or an alkaline aqueous solution followed by washing the separated solids with the other of said acid or alkaline aqueous solutions; and (4) adding said aqueous mixture to a gas stream for removal of $NO_x$ and $SO_2$.

42. The process of claim 29 wherein the recovered mixture of solids or particulates in step (1) comprise the iron chelate of amino acid moiety, alkali and fly ash; and which particulates are treated as follows:

(2) washing the particulates of step (1) with a relatively neutral aqueous solution having a pH of between about 5 and 8 with subsequent separation of the aqueous wash and the particulates;

(3) treating the aqueous wash of step (2) with calcium carbonate to form calcium salts including calcium sulfite and calcium sulfate;

(4) separating the solid calcium sulfite and calcium sulfate particulates formed in step (3) from the aqueous solution containing said alkali from step (2);

(6) washing the particulates of step (1) with an aqueous solution having a pH of between about 1 and 3 with subsequent separation of the aqueous wash and the particulates; and (7) to the separated liquid wash from step (6) adding additional amino acid moiety iron (II) ion, and alkali to produce an effective chelating aqueous solution or slurry having a pH of between about 5 and 11;

(8) recyclying the aqueous solution of step (7) to the treating zone of fluid streams for removal of $NO_x$ and $SO_2$;

(9) separating the aqueous wash containing dimeric amino acid and the particulates containing fly ash; and

(10) recycling the wash containing dimeric amino acids to a vessel for cleaving and reducing the dimeric acid to the monomeric form.

43. A process for the removal of $NO_x$, $SO_2$ and particulates from fluid stream, which process comprises:

(a) injecting into a contact zone an aqueous solution or slurry itself comprising: (i) an amino acid moiety selected from cysteine, glutathione, penicillamine or N-acylcysteine, wherein the N-acyl group has from 2 to 10 carbon atoms;

(ii) iron (II) ion; and (iii) an alkali wherein said alkali comprises a basic salt selected from the salts of sodium, potassium, lithium, calcium or magnesium, wherein the aqueous solution has a pH of between about 4 and 12, and forming particulates;

(b) collecting and washing the particulates of step (a) with an aqueous solution having a pH of between about 5 and 8 followed by separation of the aqueous wash and the particulates;

(c) washing the particulates of step (b) with an acidic aqueous solution of a mineral acid having a pH value of between about 1 and 3 with subsequent separation of the aqueous wash and the particulates;

(d) washing the particulates of step (c) with an alkaline aqueous solution having a pH value of between about 9 and 12 with subsequent separation of the aqueous wash and the particulates;

(e) discarding the particulates of step (d).

(f) recycling the aqueous solution of step (d) to the aqueous solution of slurry of step (a).

44. A process for the simultaneous removal of $NO_x$ and $SO_2$ form a fluid stream comprised of $NO_x$ and $SO_2$, which process comprises:

(AA) contacting the fluid steam in a contacting zone with an aqueous reaction mixture itself comprising an effective amount of iron (II) chelate of an amino acid moiety selected from amino acids, N-substituted amino acids, natural peptides or synthetic peptides, having at least one —SH group;

(BB) separating the fluid stream from the particulates formed in step (AA) which particulates comprise the iron chelate of the amino acid moiety, alkali wherein said alkali comprises a basic salt selected from the salts of sodium, potassium, lithium, calcium or magnesium, and fly ash;

(CC) washing the particulates of step (BB) with an aqueous solution having a pH of between about 5 and 8 with subsequent separation of the aqueous wash and the particulates;

(DD) treating the aqueous wash of step (CC) with calcium salts including calcium sulfite and calcium sulfate;

(EE) separating the solid calcium sulfite and calcium sulfate particulates formed instep (DD) from the aqueous solution containing said alkali from step (BB); and (GG) washing the particulates of step (BB) or step (BB-1) with an aqueous solution having a pH of between about 1 and 3 with subsequent separation of the aqueous wash and the particulates; and (HH) to the separated liquid wash from step (GG) optionally adding additional amino acid moiety iron (II) ion, and alkali to produce an effective chelating aqueous solution or slurry having a pH of between about 5 and 11;

(JJ) recycling the aqueous solution of step (HH) to the contacting zone of step (AA);

(KK) separating the aqueous wash containing dimeric amino acid and the particulates containing fly ash; and (LL) recycling the wash containing dimeric amino acids to a vessel for cleaving and reducing the dimeric acid to the monomeric form.

45. The process of claim 41 wherein the process further includes in step (4), adding additional amino acid moiety, iron (II) and alkali to the separated acid wash.

46. The process of claim 45 wherein the process further includes after step (4) separating alkali metal sulfite from the separated aqueous neutral wash of step (2).

47. The process of claim 46 wherein the separated aqueous wash of step (2) is added to the mixture of step (4).

48. The process of claim 47 wherein the separated aqueous wash from the alkaline wash of step (3) which contains dimeric amino acid is treated with alkali metal sulfite, sulfate and sulfides to produce the monomeric amino acid moiety having at least one —SH group.

* * * * *